US006952224B2

(12) United States Patent     (10) Patent No.:    US 6,952,224 B2
Martins et al.                                   (45) Date of Patent:     Oct. 4, 2005

(54) OBJECT TRACKABILITY VIA PARAMETRIC CAMERA TUNING

(75) Inventors: Fernando Martins, Hillsboro, OR (US); Wei Sun, Montreal (CA)

(73) Assignee: Intel Corporation, Santa Clara, CA (US)

( * ) Notice: Subject to any disclaimer, the term of this patent is extended or adjusted under 35 U.S.C. 154(b) by 766 days.

(21) Appl. No.: 09/822,549

(22) Filed: Mar. 30, 2001

(65)        Prior Publication Data

US 2004/0201719 A1 Oct. 14, 2004

(51) Int. Cl.⁷ .......................... H04N 5/228; H04N 5/225
(52) U.S. Cl. ..................... 348/222.1; 348/169
(58) Field of Search ........................... 348/222.1, 223.1, 348/224.1, 225.1, 229.1, 208.14, 169; 382/103, 274, 275; 358/518, 516, 520

(56)          References Cited

U.S. PATENT DOCUMENTS 5,689,590 A * 11/1997 Shirasawa et al. ......... 382/274
6,014,167 A * 1/2000 Suito et al. ................ 348/169
6,760,465 B2 * 7/2004 McVeigh et al. .......... 382/103
2002/0140812 A1 * 10/2002 Martins et al. ............ 348/169

* cited by examiner

*Primary Examiner*—Aung Moe
(74) *Attorney, Agent, or Firm*—Blakely, Sokoloff, Taylor & Zafman LLP

(57)          ABSTRACT

A method and apparatus are described for improving object trackability via parametric camera tuning. According to one embodiment the improving of object trackability comprises loading prior camera settings if any stored prior camera settings are available. If no stored prior camera settings are available, loading one of a plurality of predetermined camera settings. A determination is made whether the camera settings loaded cause saturation of the image and hue differences between objects and between the objects and a background of the video image. If the saturation and hue differences do not exceed the threshold, a search of camera settings is performed to increase saturation and hue differences between objects and between the objects and a background of the video image.

21 Claims, 17 Drawing Sheets

OBJECT TRACKABILITY VIA PARAMETRIC CAMERA TUNING

This application relates to co-pending application Ser. No. 09/822,648, filed Mar. 30, 2001, titled "Determining Image Quality for Improving Object Trackability".

FIELD OF THE INVENTION

The invention relates generally to the field of computer vision systems. More particularly, the invention relates to determining and improving the quality and suitability of an image for use by an object tracking system.

BACKGROUND OF THE INVENTION

Typical means of providing human interaction with computer software include keyboards, pointing devices such as the ubiquitous mouse, voice recognition, and now video input. Computer vision systems now allow for human interaction with software applications. One example of such a system is a game that allows a user to manipulate a handheld object. A camera on the system records the users movements and software in the game system tracks the movement of the handheld object. The movement of the object is then transferred to figures in the game thereby allowing the user to manipulate objects or characters within the virtual space of the game.

Cameras used for such systems typically are of the variety commonly available for use with personal computers. Such cameras are well known and used for applications such as video chat. These cameras are relatively inexpensive and reliable. However, their picture quality is relatively low and typically, camera settings such as brightness and hue cannot be adjusted externally by the user.

For such cameras, settings such as brightness, white balance, hue, and saturation are set by the manufacturer and are chosen to maximize fidelity in image reproduction for consumption by the human eye. Unfortunately, such settings are not always ideal for a system that is designed to track objects within the image. Therefore, an image produced by such a camera may or may not be suitable for use with an object tracking system.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION OF THE INVENTION

Figure 1:
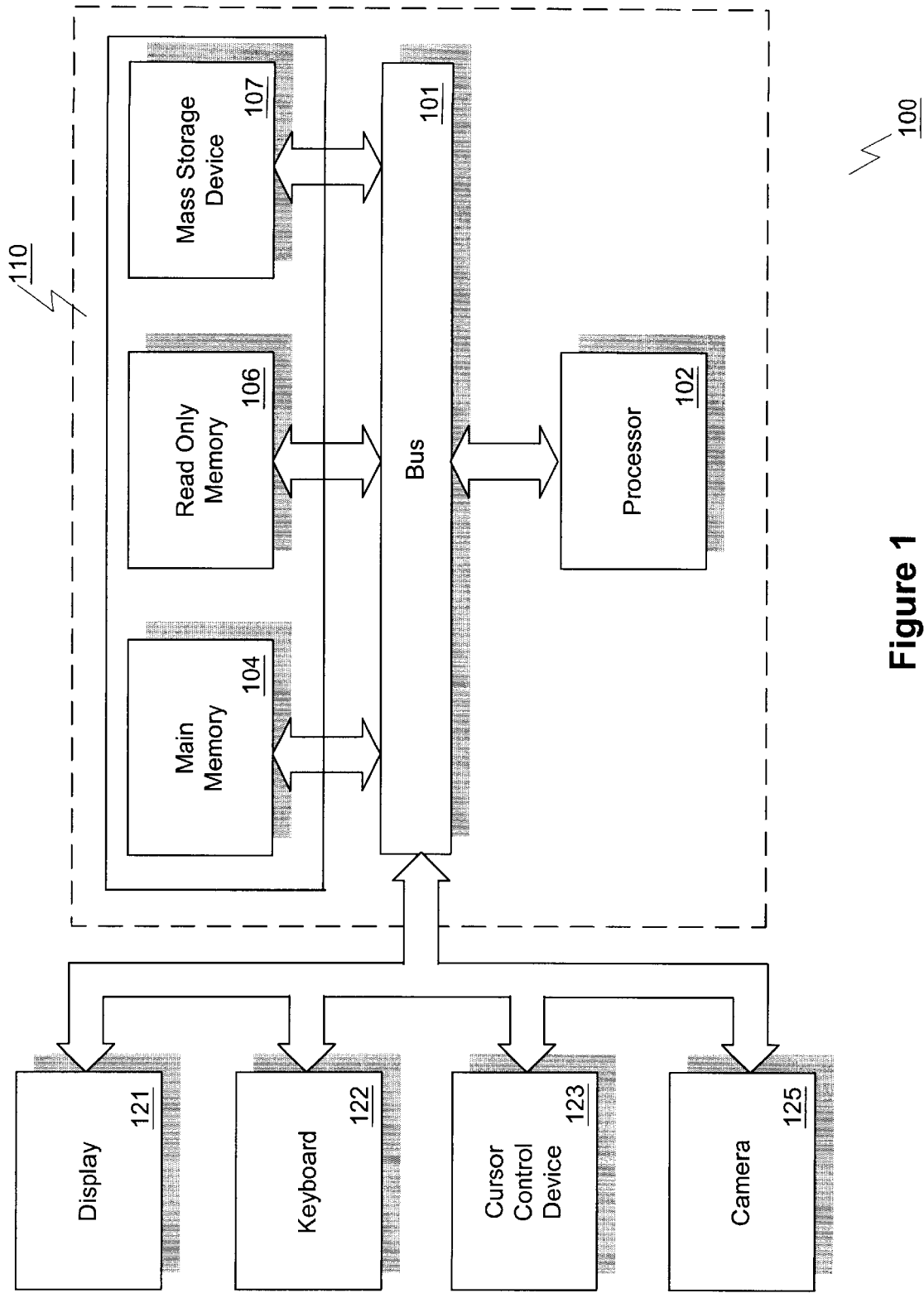
FIG. 1 is a block diagram illustrating a basic computer system upon which various embodiments of the present invention may be implemented.

A method and apparatus are described that determine and improve the suitability of an image for use by an object tracking system. According to one embodiment of the present invention an image is preprocessed to separate one or more objects to be tracked from the rest of the image and compute statistics for the one or more objects to be tracked and the rest of the image. A quality measure is generated based on the statistics for the one or more objects to be tracked and the rest of the image that indicates the suitability of the image for use by an object tracking system. The quality measure can then be used to adjust camera parameters to improve object trackability.

Adjustment of camera parameters comprises loading prior camera settings if any stored prior camera settings are available. If no stored prior camera settings are available, loading one of a plurality of predetermined camera settings. A determination is made whether the camera settings loaded maximize saturation of the image and hue differences between objects if more than one object is to be tracked and between the object and a background of the image. If the saturation and hue differences are not maximized, a mini search of camera settings is performed to maximize saturation and hue differences between objects if more than one object is to be tracked and between the object and a background of the image.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various methods, which will be described below. The methods of the present invention may be performed by hardware components or may be embodied in machine-executable instructions, which may be used to cause a general-purpose or special-purpose processor or logic circuits programmed with the instructions to perform the methods. Alternatively, the methods may be performed by a combination of hardware and software.

The present invention may be provided as a computer program product that may include a machine-readable medium having stored thereon instructions that may be used to program a computer (or other electronic devices) to perform a process according to the present invention. The machine-readable medium may include, but is not limited to, floppy diskettes, optical disks, CDROMs, and magneto-optical disks, ROMs, RAMs, EPROMs, EEPROMs, magnetic or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

FIG. 1 is a block diagram illustrating a basic computer system upon which various embodiments of the present invention may be implemented. In this example, computer system 100 comprises a bus or other communication means 101 for communicating information, and a processing means such as processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102.

A data storage device 107 such as a magnetic disk or optical disc and its corresponding drive may also be coupled to computer system 100 for storing information and instructions. Computer system 100 can also be coupled via bus 101 to a display device 121, such as a cathode ray tube (CRT) or Liquid Crystal Display (LCD), for displaying information to an end user. Typically, an alphanumeric input device 122, including alphanumeric and other keys, may be coupled to bus 101 for communicating information and/or command selections to processor 102. Another type of user input device is cursor control 123, such as a mouse, a trackball, or cursor direction keys for communicating direction information and command selections to processor 102 and for controlling cursor movement on display 121.

A camera 125 is also coupled to bus 101. The camera 125 maybe of the type commonly available for use with personal computers and frequently used for such applications as video chat. Of course, other, higher quality cameras may be used such as digital video cameras. The camera 125 is coupled with the bus 101, possibly through an interface card (not shown).

It is appreciated that a lesser or more equipped computer system than the example described above may be desirable for certain implementations. For example, a gaming system may not require a keyboard 122. Therefore, the configuration of computer system 100 will vary from implementation to implementation depending upon numerous factors, such as price constraints, performance requirements, technological improvements, and/or other circumstances.

It should be noted that, while the methods described herein may be performed under the control of a programmed processor, such as processor 102, in alternative embodiments, the methods may be fully or partially implemented by any programmable or hard-coded logic, such as Field Programmable Gate Arrays (FPGAs), TTL logic, or Application Specific Integrated Circuits (ASICs), for example. Additionally, the methods of the present invention may be performed by any combination of programmed general-purpose computer components and/or custom hardware components. Therefore, nothing disclosed herein should be construed as limiting the present invention to a particular embodiment wherein the recited methods are performed by a specific combination of hardware components.

Figure 2:
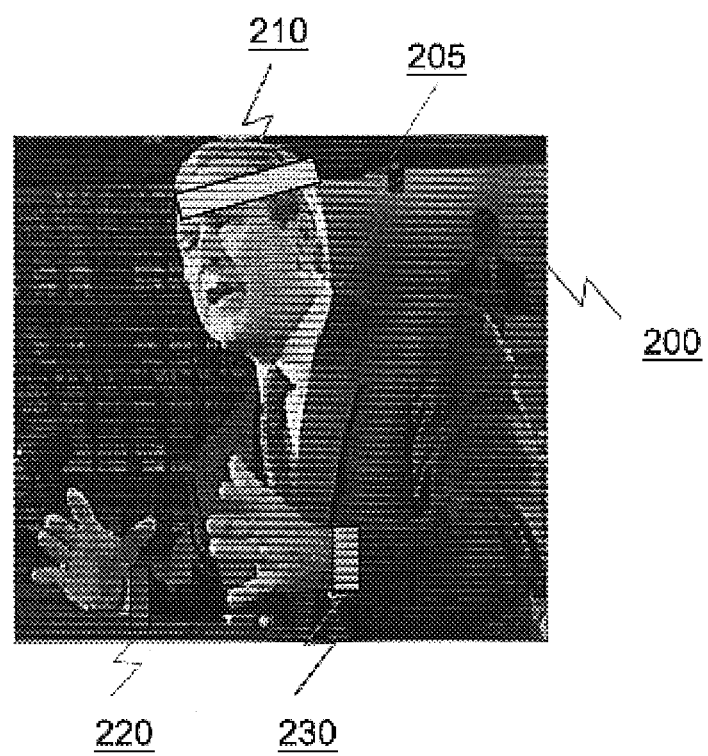
FIG. 2 is a picture illustrating a typical image containing objects to be tracked according to one embodiment of the present invention.

FIG. 2 is a picture illustrating a typical image containing objects to be tracked according to one embodiment of the present invention. The image in this example depicts an individual 205 possibly interacting with an object tracking system. In some implementations of object tracking the individual 205 may wear brightly colored wristbands 220 and 230 and a headband 210 to be tracked by the object tracking system thereby providing tracking of movement of the individual's head and hands. Alternatively, the individual may hold an object that will tracked. Regardless of the object to be tracked, the tracking system must be able to distinguish the objects from the rest of the image and from each other.

Figure 3:
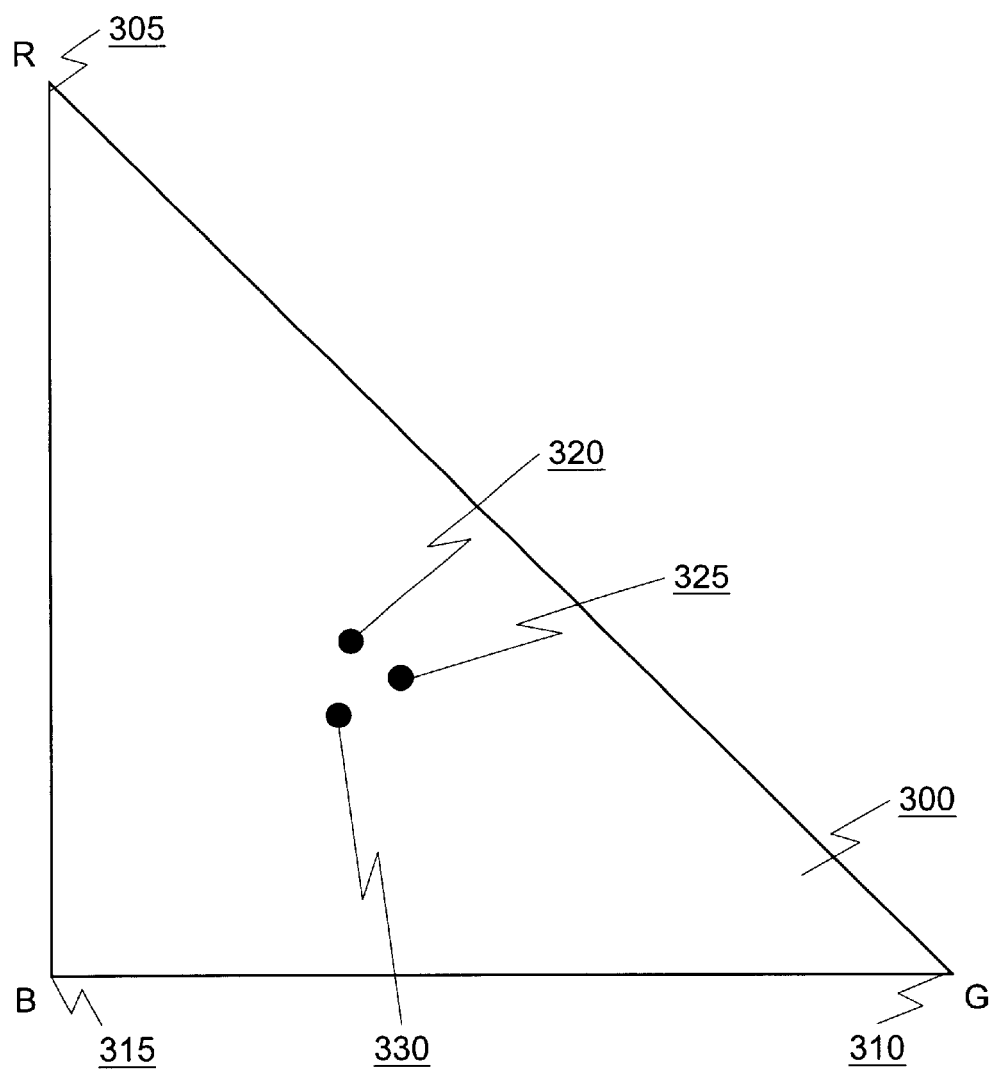
FIG. 3 is a chart illustrating the color representation in red-green-blue (RGB) of objects to be tracked within an image according to one embodiment of the present invention.

FIG. 3 is a chart illustrating the color representation in red-green-blue (RGB) of objects to be tracked within an image according to one embodiment of the present invention. In this example, the colors available within an image are represented on triangle 300 with the colors red, green and blue at each of the corners 305, 310, and 315 respectively. An object or pixel that is pure green would therefore be represented at the far corner 310. However, most objects are not composed of pure colors. Most objects are a combination of red, green, and blue and therefore fall somewhere within the triangle. In this example, three objects 320, 325, and 330 are represented on the triangle 300. While this representation may provide an accurate, high fidelity version of the image to the human eye, such a representation is not optimal for object tracking purposes.

For object tracking, the optimal set of values is intuitively the one that causes all objects to be tracked to be reproduced maximally apart in a given color space, while minimizing confusion with the background. That is, to maximize trackability, the objects 320–330 would ideally be located as far apart as possible. In this example, the objects 320–330 would be maximally separated if they were located in the three corners 305, 310, and 315. However, in actual applications, some separation less than maximum may be sufficient to allow objects to be tracked effectively.

Figure 4:
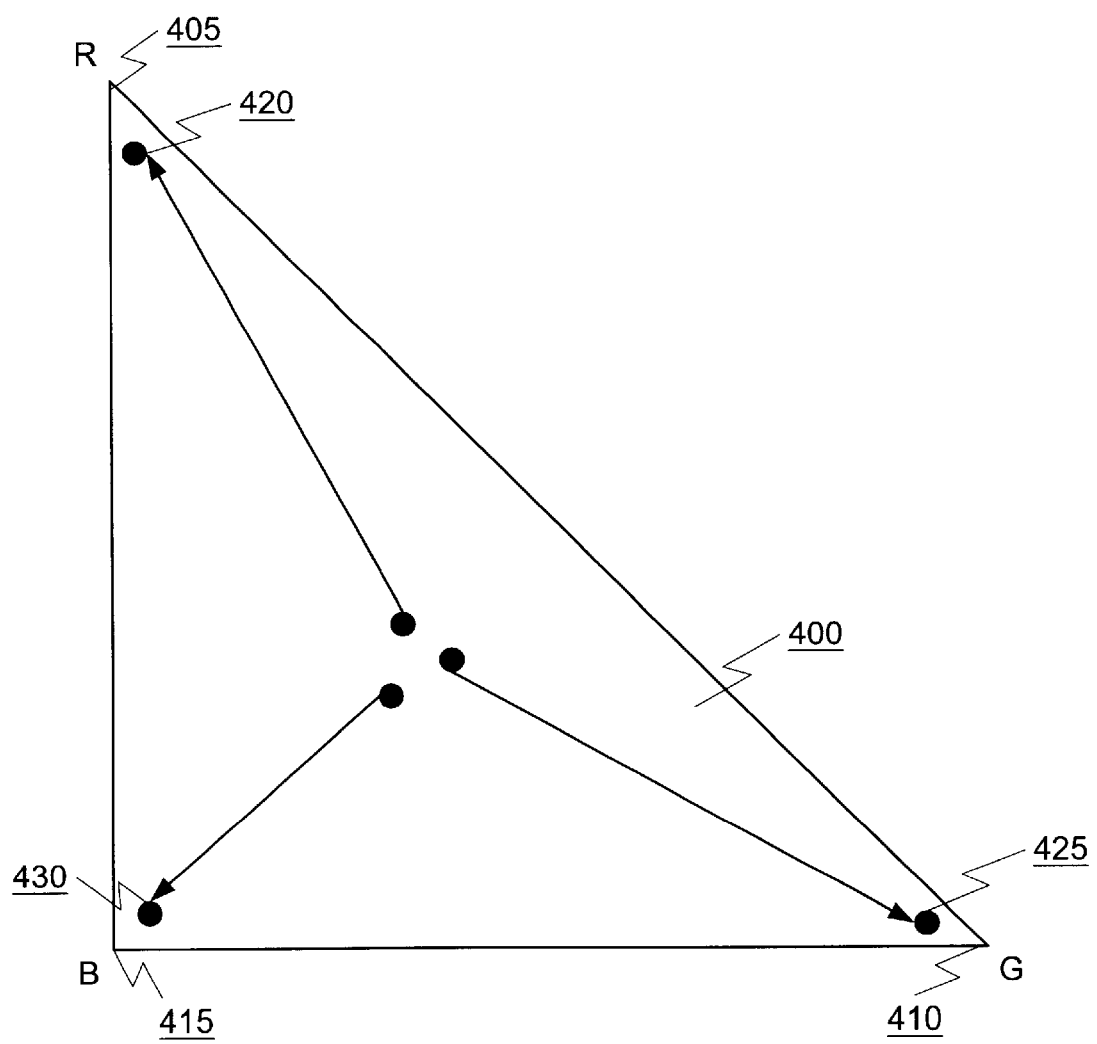
FIG. 4 is a chart illustrating the color representation in red-green-blue (RGB) of objects to be tracked within an image after adjustment to improve trackability according to one embodiment of the present invention.

FIG. 4 is a chart illustrating the color representation in red-green-blue (RGB) of objects to be tracked within an image after adjustment to improve trackability according to one embodiment of the present invention. In this example, the objects 420, 425, and 430 have been moved toward the corners 405, 410, and 415 of the triangle 400 thereby increasing the separation between them and improving trackability of each object. This adjustment could be made by either adjusting camera settings such as hue and saturation or by manipulating the image itself.

To ensure trackability of objects, an object tracker needs objects to be reproduced with high saturation values to increase their visibility. To avoid confusion between the objects and the background, the background should be reproduced with low saturation. To increase separability the image should have large hue differences between objects and between all objects and the background.

To determine whether these requirements are met, a quality measure can be used. A quality measure criterion is helpful for evaluating image quality objectively and quantitatively. The quality function that generates this quality measure should be camera independent. No camera setting information should be used in calculating the quality measure. Therefore, the quality function can be used to evaluate image qualities for any camera with any camera settings.

Figure 5:
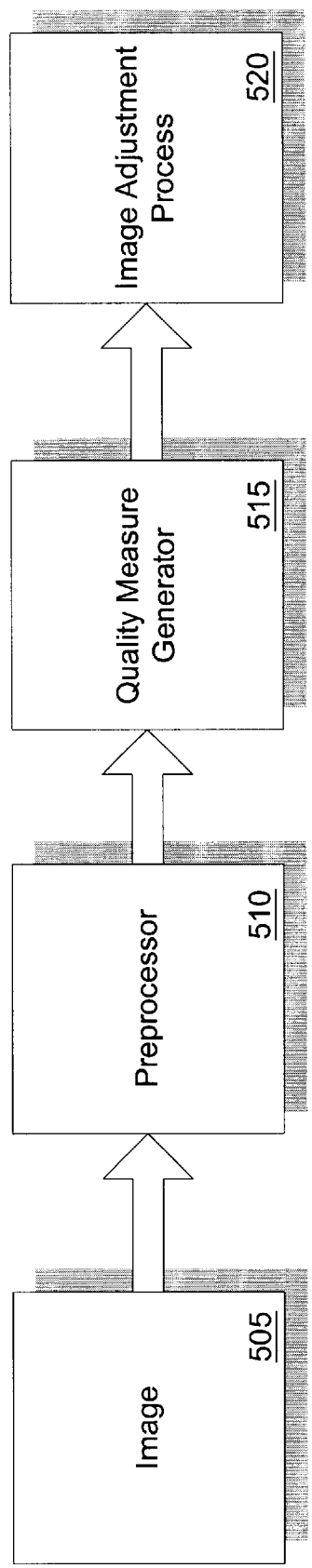
FIG. 5 is a block diagram illustrating a process for improving object trackability according to one embodiment of the present invention.

FIG. 5 is a block diagram illustrating a process for improving object trackability according to one embodiment of the present invention. In this example, an image 505 is processed by a preprocessor 510 and a quality function generator 515 that together determine the quality measure for the image 505. Details of the processing of the preprocessor 510 and quality function generator 515 will be discussed in greater detail below with reference to FIGS. 7–11. The quality measure produced by the quality function generator 515 can then be used to adjust the image 505 in the image adjustment process 520. The image adjustment process 520 is preferably a process such as described below with reference to FIGS. 12–17.

Figure 6:
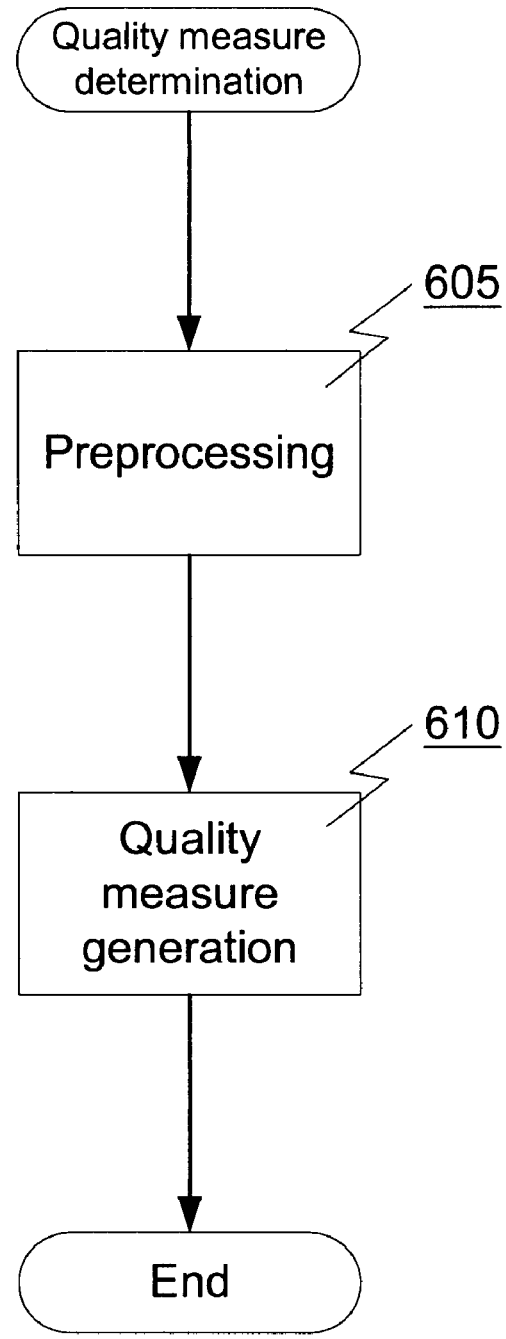
FIG. 6 is a flowchart illustrating a process for generating an image quality measure according to one embodiment of the present invention.

FIG. 6 is a flowchart illustrating a process for generating an image quality measure according to one embodiment of the present invention. Here, preprocessing is performed at block 605 followed immediately by quality measure generation at block 610. The quality measure can then be used by other processes as discussed above. Details of preprocessing are discussed below with reference to FIGS. 7–10 and quality measure generation is discussed with reference to FIG. 10.

Figure 7:
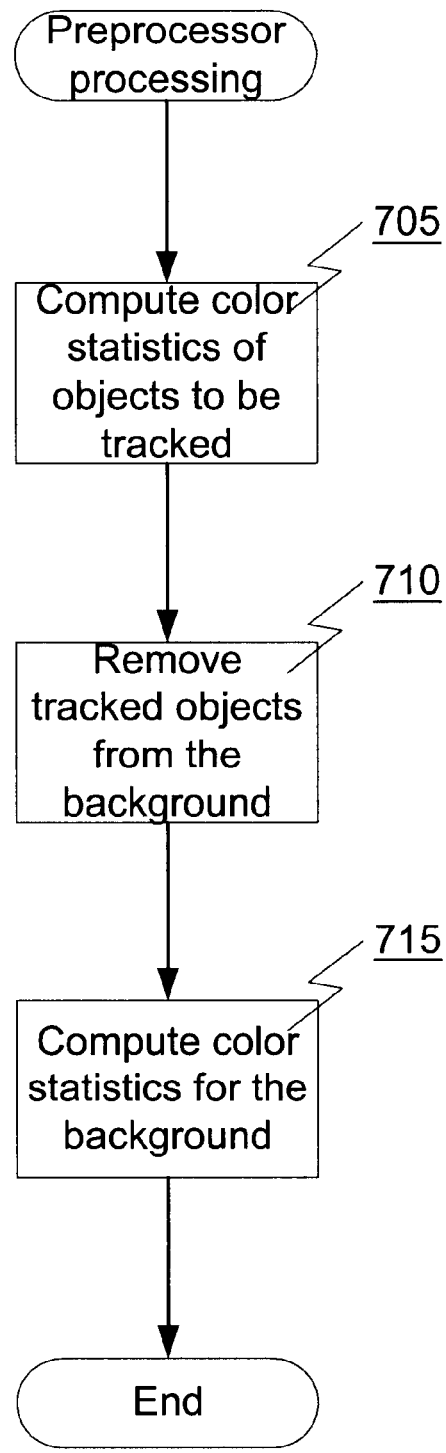
FIG. 7 is a flowchart illustrating preprocessor processing according to one embodiment of the present invention.

FIG. 7 is a flowchart illustrating preprocessor processing according to one embodiment of the present invention. In the preprocessing stage, color statistics of objects to be tracked and the background of an image are computed. As illustrated in this example, color statistics of the object to be tracked are computed at processing block 705. Details of this process are discussed below with reference to FIG. 8. Next, at processing block 710, the objects to be tracked are removed from the background of the image. Details of this process are discussed below with reference to FIG. 9. Finally, at processing block 715, color statistics for the background are computed. Details of this process are discussed below with reference to FIGS. 10 and 11.

Figure 8:
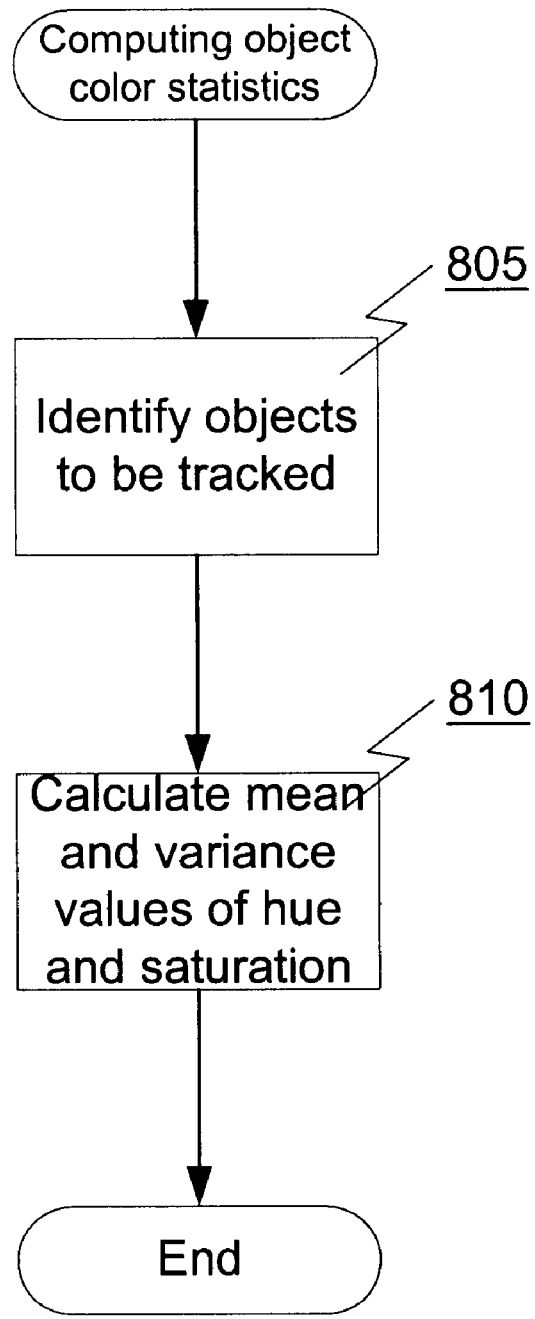
FIG. 8 is a flowchart illustrating a process for computing color statistics according to one embodiment of the present invention.

FIG. 8 is a flowchart illustrating a process for computing color statistics according to one embodiment of the present invention. Initially, at processing block 805, the objects to be tracked are identified. Preferably, as soon as the system starts, calibration rectangles will automatically appear on the image and all objects to be tracked will be aligned with corresponding rectangles by the user. Alternatively, the calibration rectangles may be moved by a user to align them with the objects to be tracked. Next, at processing block 810, the mean value and variance value of hue and saturation of each object to be tracked are calculated from pixels within the calibration rectangles. All values of hue and saturation are sample averages taken directly from the sensor data.

Figure 9:
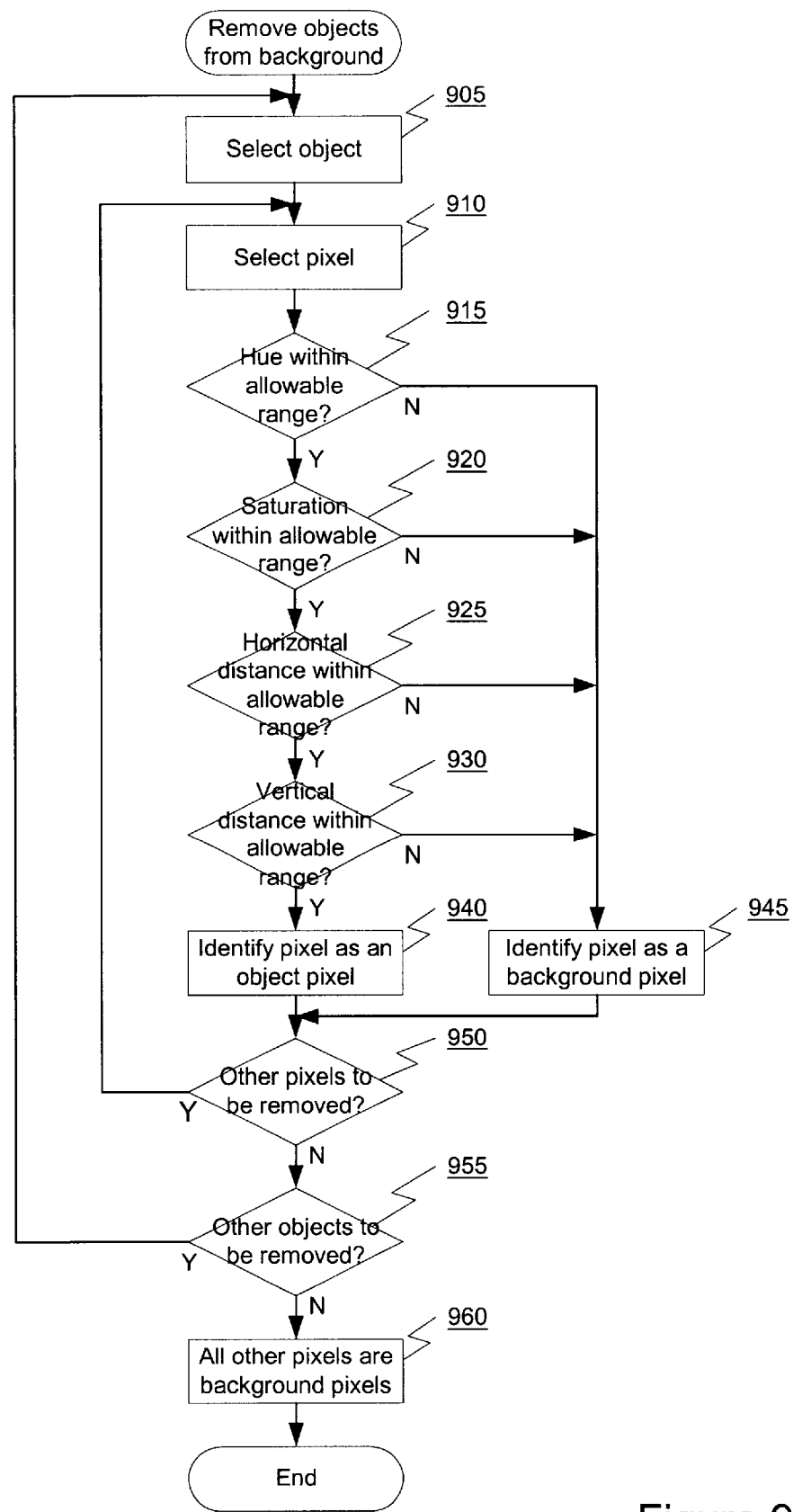
FIG. 9 is a flowchart illustrating a process for removing objects from the background of an image according to one embodiment of the present invention.

FIG. 9 is a flowchart illustrating a process for removing objects from the background of an image according to one embodiment of the present invention. Before computing color statistics of the background, objects to be tracked need to be removed from the background. This process segregates pixels belonging to the objects to be tracked from pixels belonging to the background.

First, one of the objects to be tracked, identified by being within the calibration rectangle as described above, is selected at processing block 905. Next, at processing block 910, a pixel within that object is selected. In order to identify pixels as being object pixels or background, pixels a region growing algorithm is employed to segment out the objects. Both color thresholding and distance thresholding are used in the region growing algorithm.

Color thresholding is performed at decision blocks 915 and 920. If the hue of the pixel is determined to be outside of the allowable range for hue at decision block 915 or the saturation of the pixel is determined to be outside of the allowable range at processing block 920, the pixel is identified as a background pixel at processing block 945. More specifically, given a pixel with hue H and saturation S, where $H_{mean}$ and $H_{var}$ are hue mean and hue variance and $S_{mean}$ and $S_{var}$ are saturation mean and saturation variance respectively, the pixel is classified as an object pixel candidate if $|H-H_{mean}|<\alpha(H_{var})^{1/2}$ and $|S-S_{mean}|<\alpha(S_{var})^{1/2}$ are satisfied. In this equation $\alpha$ is a constant, which preferably is equal to 10.

Distance thresholding is performed at decision blocks 925 and 930. If the horizontal distance of the pixel from the center of the calibration rectangle is determined to outside the allowable range at decision block 925 and the vertical distance of the pixel from the center of the calibration rectangle is determined to be outside the allowable range at processing block 930, the pixel is identified as a background pixel at processing block 945. More specifically, given a pixel at position (x,y), where ($X_c$, $Y_c$) is the center of the calibration rectangle and width and height give the size of the image, a pixel is considered to be an object pixel candidate if $|x-X_c|<\beta$ max(Width, Height) and $|y-Y_c|<\beta$ max(Width, Height) are satisfied. In this equation $\beta$ is a constant, which preferably is equal to 0.1.

If the pixel is determined by color thresholding to be within the allowable ranges for hue and saturation at decision blocks 915 and 920 and by distance thresholding to be within the allowable ranges for horizontal and vertical distance at decision blocks 925 and 930, the pixel is identified as an object pixel at processing block 940. For each pixel that is classified as an object pixel, all of its neighboring pixels are examined. Therefore, at decision block 950, if neighboring pixels are yet to be classified, processing returns to block 910 to perform color and distance thresholding on these pixels. This procedure is done for all objects to be tracked. So, at decision block 955, if other objects are yet to be removed from the image, processing returns to block 905. After all objects have been removed from the image remaining pixels that have not been classified to any of the objects are considered to be background pixels at processing block 960.

Figure 10:
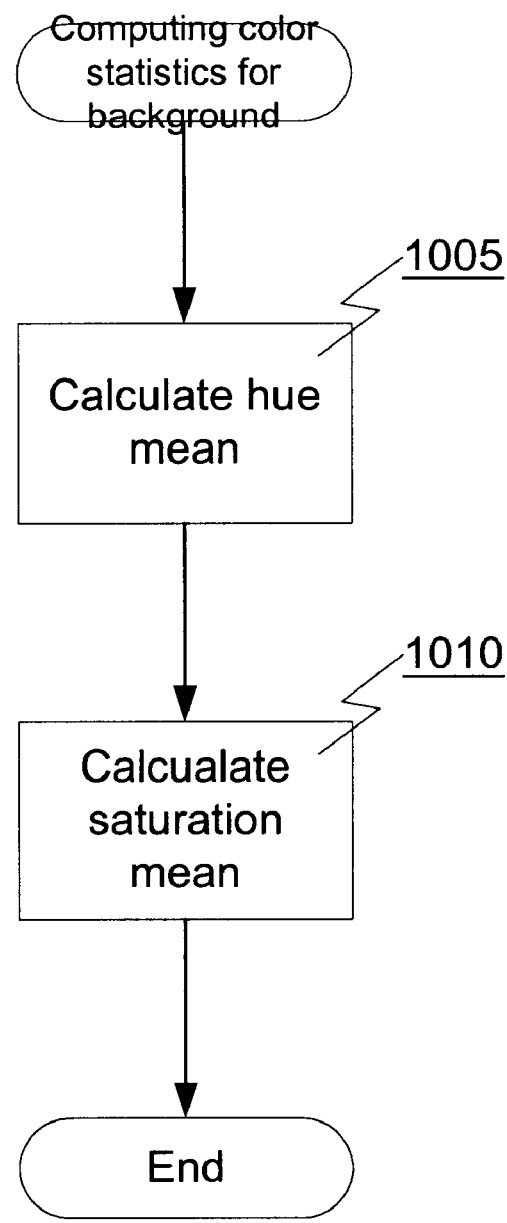
FIG. 10 is a flowchart illustrating a process for computing color statistics for a background of an image according to one embodiment of the present invention.

FIG. 10 is a flowchart illustrating a process for computing color statistics for a background of an image according to one embodiment of the present invention. The hue mean and saturation mean are calculated from background pixels identified as described above with reference to FIG. 9. In this example the hue mean is calculated at processing block 1005. Saturation mean is then calculated at processing block 1010. All values of hue and saturation are sample averages taken directly from the sensor data.

As explained above, to improve trackability, an object tracker needs objects to be reproduced with high saturation values to maximize their visibility. To avoid confusion between the objects to be tracked and the background, the background should be reproduced with low saturation. To improve separability between objects to be tracked there should be large hue differences between objects and between all objects and the background. Unfortunately, not all images will meet these requirements. To determine an image's suitability for object tracking a quality measure can be produced. A quality measure is helpful for evaluating image quality objectively and quantitatively.

Figure 11:
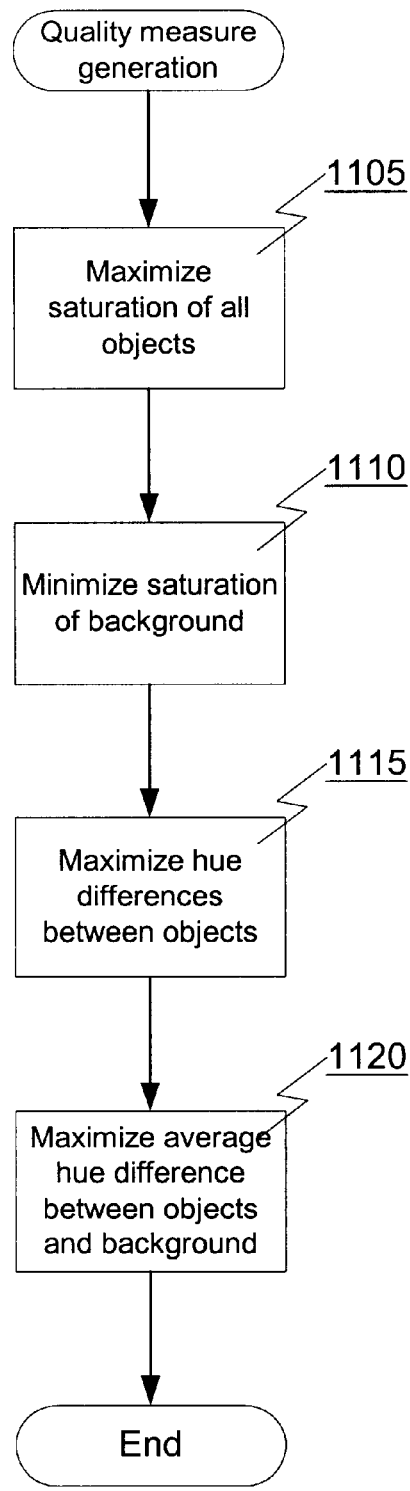
FIG. 11 is a flowchart illustrating generation of a quality measure for an image according to one embodiment of the present invention.

FIG. 11 is a flowchart illustrating generation of a quality measure for an image according to one embodiment of the present invention. The quality measure is designed to fit the needs of a color object tracker. The object tracker assumes that color objects have high saturation values while the background has low saturation and the hue values between objects and those between objects and background are different. In this example, the saturation of all objects to be tracked is maximized at processing block 1105. Next, at processing block 1110, the saturation of the background is minimized. The hue differences between all objects to be tracked is maximized at processing block 1115. Finally, at processing block 1120, the average hue difference between the objects to be tracked and the background is maximized.

Mathmatically, the quality function is defined as follows:

$$Q = k_1 \min_i\{S_i\} - k_2 S_b + k_3 \min_{ij}\{\mathit{diff}(H_i, H_j)\} + k_4 \mathit{avg}_i\{\mathit{diff}(H_i, H_b)\}.$$

Here H and S express the mean values of hue and saturation separately. $H_i$ and $S_i$ represent the hue and saturation of $i^{th}$ object. $H_b$ and $S_b$ represent the hue and saturation of the background. $k_1$–$k_4$ are constants. Preferably, these constants have the following values: $k_1$=2.0; $k_2$=1.5; $k_3$=1.0; and $k_4$=1.0.

The quality measure is composed of four terms. The first term maximizes the saturation of all objects as in processing block 1105. The second term minimizes the saturation of the background as in processing block 1110. The third term maximizes the hue differences between all objects as in processing block 1115. The fourth term maximizes the average hue differences between all objects and the background as in processing block 1120.

In one possible application an object tracker can be used to track colorful bands on the wrists and head of a user. This means that the user's face and limbs are often present in the scenes. Unfortunately the contribution of skin tones in the general background statistics is often troublesome since skin color changes significantly with lighting and often causes confusion with pink or red objects. It is therefore very important to take into account the skin color separately to avoid confusion with pink/red objects. This is done by adding three additional terms to the quality function:

$$Q = k_1 \min_i\{S_i\} - k_2 S_b + k_3 \min_{ij}\{\mathit{diff}(H_i, H_j)\} + k_4 \mathit{avg}_i\{\mathit{diff}(H_i, H_b)\} - k_5 S_f + k_6 \mathit{avg}_i\{\mathit{diff}(H_i, H_f)\} - k_7 \mathit{diff}(H_f, H_b).$$

Here $H_f$ and $S_f$ represent the hue and saturation of skin color. $k_1$–$k_7$ are constants. Preferably, these constants have the following values: $k_1$=2.0; $k_2$=1.5; $k_3$=1.0; $k_4$=1.0; $k_5$=1.5; $k_6$=1.0; and $k_7$=1.0.

The fifth term of the equation minimizes the saturation of skin color to reduce its visibility. The sixth term maximizes the average hue differences between skin color and objects to improve seperability. The seventh term minimizes the hue differences between skin color and the background to merge the background and skin in the color space. Overall, skin color rejection is trying to make the skin color part of the background instead an object.

The quality function described above is camera independent. No camera setting information has been used in calculating the quality value. Therefore, the quality function can be used to evaluate image qualities for any camera with any camera settings. Once generated, this quality measure may be used to adjust camera settings such as hue, saturation, brightness, and white balance to improve object trackability. However, camera adjustment may be accomplished without the use of a quality measure as described supra. Other means of determining whether the basic requirements of an object tracker, namely high saturation and high hue differences, have been met may be used.

Figure 12:
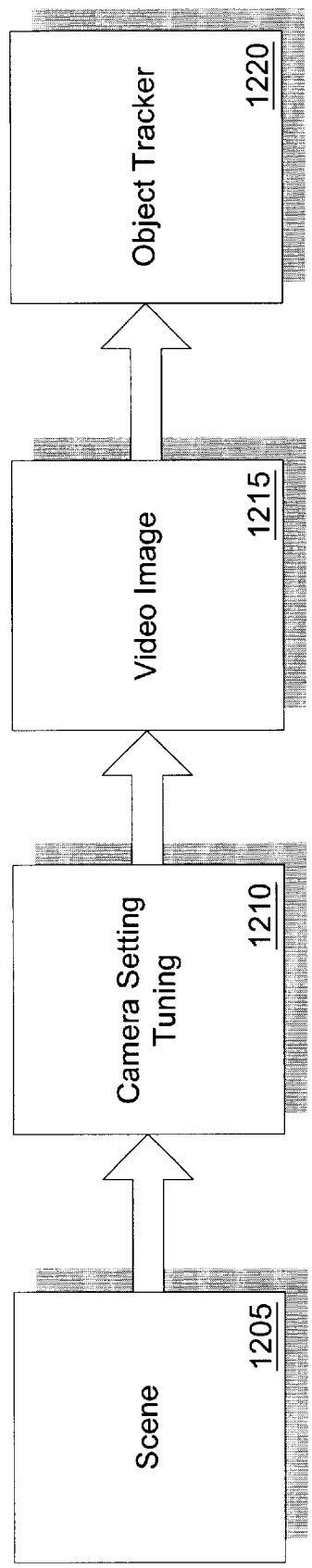
FIG. 12 is a block diagram illustrating a process for improving object trackability according to one embodiment of the present invention.

FIG. 12 is a block diagram illustrating a process for improving object trackability according to one embodiment of the present invention. In this example, an image or scene 1205 is processed by a camera tuning process 1210. Details of the processing of the camera tuning process 1210 will be discussed in greater detail below with reference to FIGS. 13–17. Briefly, the camera tuning process will automatically adjust camera settings to allow the scene to be reproduced with the high saturation and large hue differences required by the object tracker 520. The camera tuning process 1210 then allows a camera to produce a video image 1215 that is maximized for object trackability and suitable for use by an object tracker 1220.

Figure 13:
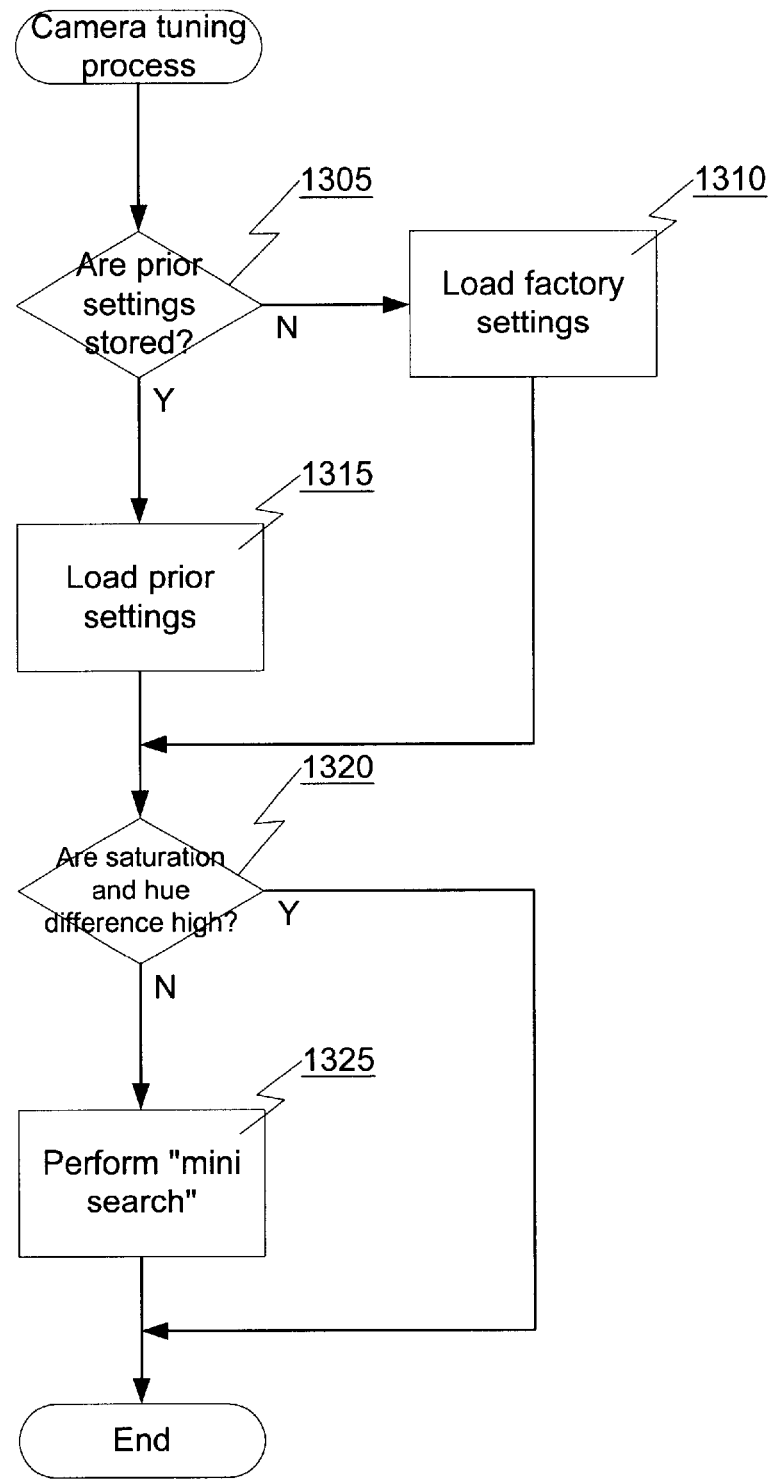
FIG. 13 is a flowchart illustrating a high level view of camera tuning for improving object trackability according to one embodiment of the present invention.

FIG. 13 is a flowchart illustrating a high level view of camera tuning for improving object trackability according to one embodiment of the present invention. In this example, a determination is made at decision block 1305 whether any prior camera settings have been stored. If prior camera settings have been stored, those settings are loaded at processing block 1315. Using prior settings requires no tuning procedure and can cover many controlled lighting environments. If no prior settings are available, predetermined factory settings can be loaded at processing block 1310.

Next, at decision block 1320 a determination is made whether the requirements of the object tracker have been met. That is, a determination is made whether the image has a high saturation value and high hue differences between the objects to be tracked and between the objects and the background. As explained above, a quality measure may be used to determine whether these requirements have been met. Alternatively, a determination may be based on simply comparing the values of saturation and hue differences to predetermined minimum amounts.

Finally, if saturation and hue differences are suitable for object tracking, a mini search of camera settings is performed at processing block 1325. Details of the mini search process will be described below with reference to FIGS. 15 and 16. Briefly, this process consists of doing a full search of a mini space or reduced range of camera settings. Therefore, the camera tuning system consists of four phases: a factory settings phase; a mini search phase; a full search phase which is part of the mini search phase; and a prior settings phase. Each of these phases will be described in detail below with reference to FIGS. 14–17.

Figure 14:
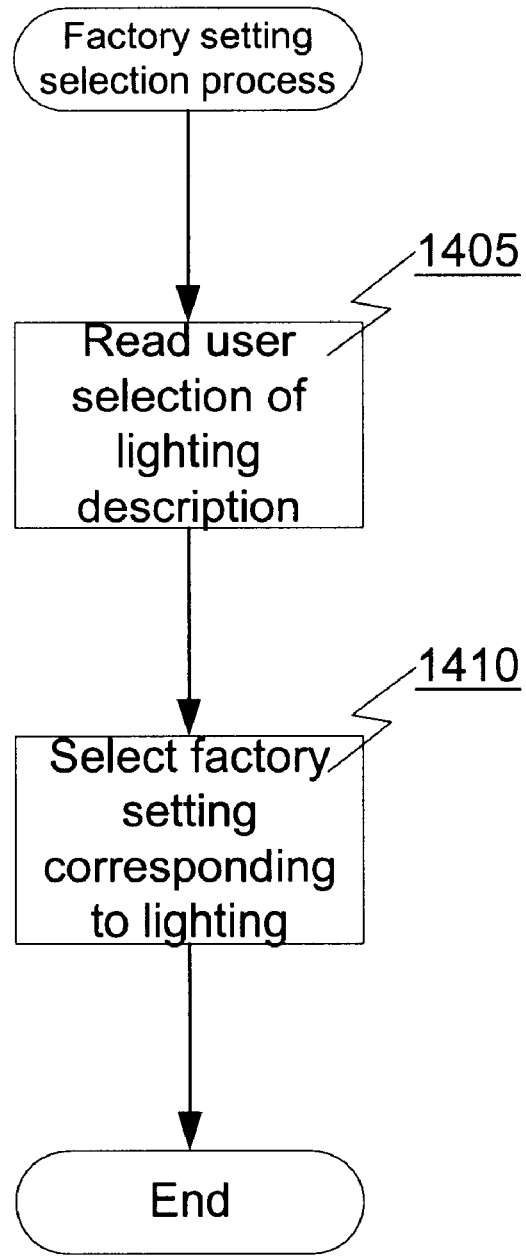
FIG. 14 is a flowchart illustrating processing for selecting factory camera settings according to one embodiment of the present invention.

FIG. 14 is a flowchart illustrating processing for selecting factory camera settings according to one embodiment of the present invention. In one embodiment of the present invention there are three factory settings for any new lighting environment: daytime setting; nighttime setting; and sunshine setting. These three factory settings can cover most real life lighting conditions for the object tracker. The factory settings process sets the camera to any of these three settings according to the user's choice. As illustrated in FIG. 14, the process reads a user selection that describes the lighting conditions at processing block 1405. The process at processing block 1410 then selects a factory setting corresponding to the lighting condition selected by the user.

Figure 15:
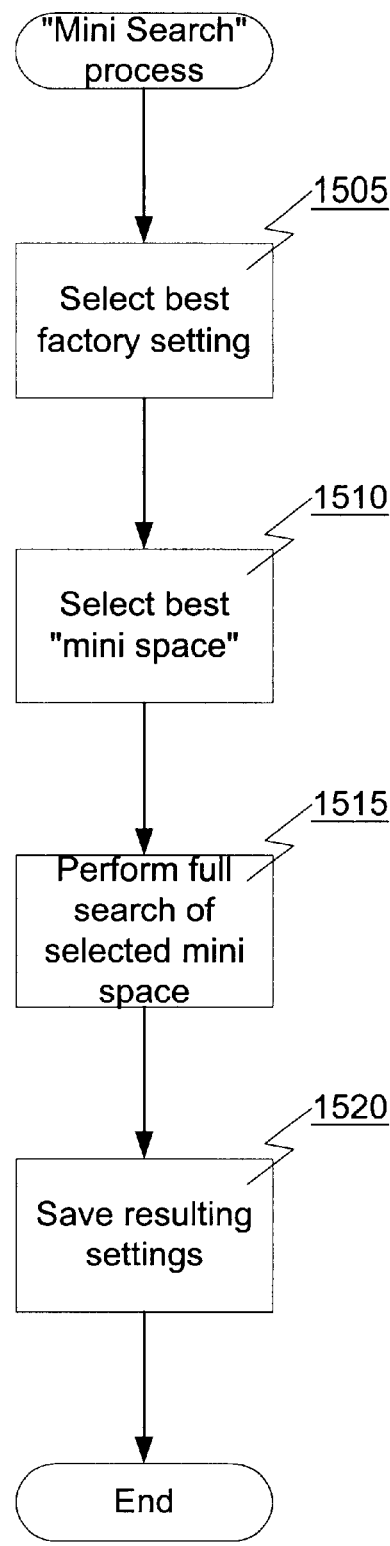
FIG. 15 is a flowchart illustrating processing for performing a mini search of camera settings according to one embodiment of the present invention.

FIG. 15 is a flowchart illustrating processing for performing a mini search of camera settings according to one embodiment of the present invention. The mini search is designed for lighting environments where factory settings do not work satisfactorily and applies only when none of the three factory settings is able to produce satisfactory image quality. As illustrated in FIG. 15, the process first tests all three factory settings in a certain lighting environment and finds the best factory setting for that lighting at processing block 1505. As explained above, the best setting is the one that produces the highest saturation and greatest hue differences between the objects to be tracked and the objects and the background. If a quality measure is used, the best settings are those that produce the highest quality measure.

Next, at processing block 1510, a mini space or reduced range of camera settings or mini space is selected. Generally, the brighter the external lighting environment, the higher the white balance of the camera should be. Based on this observation, the range of white balance is divided into three parts with a slight overlap. As an example, settings for an Intel PC Pro camera would be 0 to 0.33 for night-time, 0.33 to 0.67 for daytime, and 0.56 to 0.89 for sunshine. Therefore, the searching subspace of full search can be divided into three slightly overlapping mini spaces. Only the most promising mini-space is searched during mini-search according to on-the-spot lighting conditions. Again, the best mini space is the one that produces the highest saturation and greatest hue differences between the objects to be tracked and the objects and the background. If a quality measure is used, the best mini space is the one that produces the highest quality measure.

An exhaustive search of all possible camera settings takes too much time. The PC Pro camera as an example, has brightness ranges from 0 to 255, hue from 135 to 225, saturation from 208 to 400, and white balance from 0 to 20, hence totaling up to 94,418,688 possible settings. Each setting change takes the camera 4 frames on average to become stable. Given the camera's frame rate of 15 frames per second, exhaustive search would require approximately 6,879 hours, that is 286 days, of processing time which is obviously impractical. Mini-search therefore reduces the time needed to perform the search and is able to achieve satisfactory results in various lighting environments.

A full search of the selected mini space is then conducted at processing block 1515. Details of the full search are described below with reference to FIG. 16. Briefly, this process consists of adjusting the camera settings through the mini space to find the settings with the greatest saturations and hue differences or greatest quality measure. Finally, at processing block 1520, the settings found by the search are saved for possible future use, thereby possibly eliminating the need to perform another search if the lighting conditions remain the same.

Figure 16:
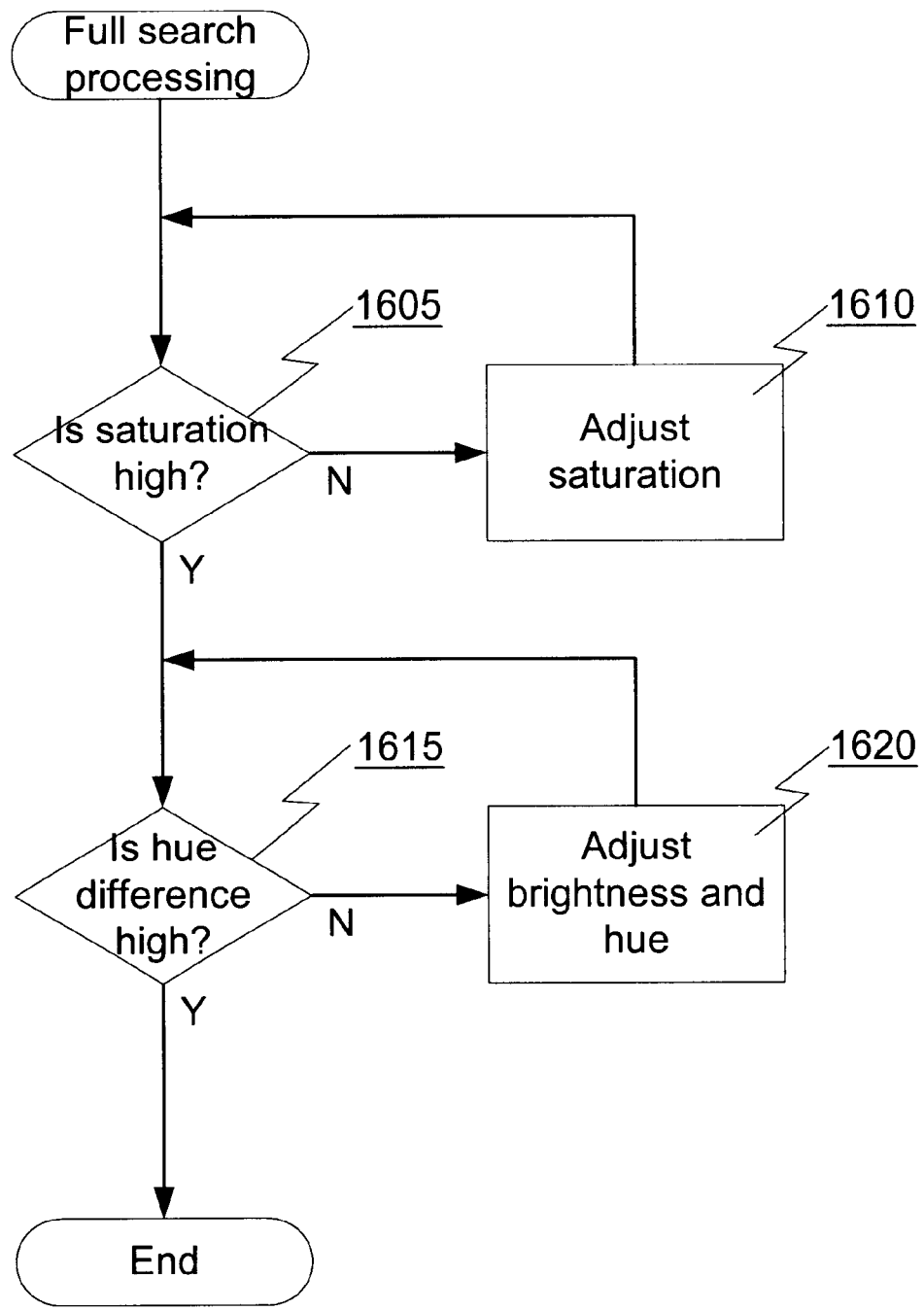
FIG. 16 is a flowchart illustrating processing for performing a full search of camera settings according to one embodiment of the present invention.

FIG. 16 is a flowchart illustrating processing for performing a full search of camera settings according to one embodiment of the present invention. The full search exhaustively searches through a mini space of camera settings and finds the best setting that can produce images with the highest quality. As illustrated in FIG. 16, the process first determines at decision block 1605 whether saturation is high. If not high, saturation is adjusted at processing block 1610.

Next, a determination is made at decision block 1615 whether the hue difference between the objects and between the objects and the background are high. If the hue differences are not high, the brightness and hue settings are adjusted at processing block 1620. Once again, a quality measure may be used to determine whether these requirements have been met. Alternatively, a determination may be based on simply comparing the values of saturation and hue differences to predetermined minimum amounts.

Generally, the higher the camera's saturation, the higher the image quality. For an Intel PC Pro camera, optimal solutions are mostly found within 0.22 to 0.56 of the range of camera brightness and within 0.22 to 0.78 of the range of camera hue. The searching space can therefore be restricted using these observations by fixing saturation at the maximum value and tuning brightness and hue in the reduced ranges.

Figure 17:
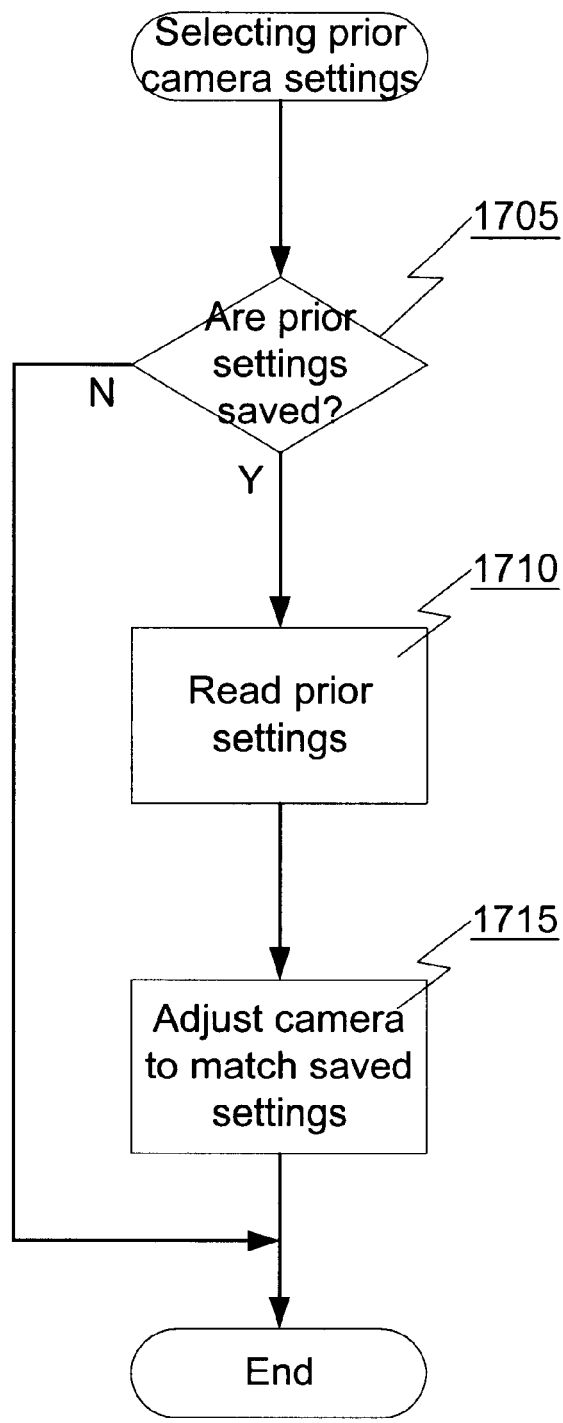
FIG. 17 is a flowchart illustrating processing for selecting prior camera settings according to one embodiment of the present invention.

FIG. 17 is a flowchart illustrating processing for selecting prior camera settings according to one embodiment of the present invention. This phase requires no tuning but simply sets the camera to a prior setting which can be a setting obtained and stored by the camera tuning system in the past. Storing a frequently used camera setting as a prior setting is very convenient for users who work in a controlled lighting environment most of the time.

As illustrated in FIG. 17, the process first checks at decision block 1705 whether prior settings have been saved. If prior settings have been saved, the settings are read at processing block 1710 and the camera is adjusted to match the saved settings at processing block 1715. Prior settings are used for further convenience of the user. If none of the three factory settings works satisfactorily in a certain environment and a mini search or a full search has been done to generate a good camera setting, it will be useful to store this setting especially if the environment is the most often used environment for that user. Next time the object tracker starts the prior setting can be loaded directly into the system without any more searching time.

What is claimed is:

1. A method of improving trackability of at least one object within a video image comprising:

loading prior camera settings if any stored prior camera settings are available;

loading one of a plurality of predetermined camera settings;

determining whether the camera settings loaded cause saturation of the video image and hue differences between objects to be tracked and between the objects and a background of the video image to exceed a threshold; and if the saturation and hue differences do not exceed said threshold, searching camera settings to find settings that cause saturation and hue differences between objects and between the objects and the background of the image to exceed said threshold.

2. The method of claim 1, wherein said camera settings comprise saturation, hue, brightness and white balance.

3. The method of claim 1, wherein said loading one of a plurality of predetermined camera settings comprises:

reading a user selection describing lighting conditions; and selecting one of said plurality of predetermined camera settings responsive to said user selection.

4. The method of claim 1, wherein said searching comprises:

selecting one of said plurality of predetermined camera settings;

selecting a range of camera settings near a selected predetermined camera setting;

performing a full search of a selected range of camera settings; and saving results of said full search.

5. The method of claim 4, wherein said selecting one of said predetermined camera settings is based on the settings causing saturation and hue differences between objects and between the objects and a background of the video image to exceed a threshold.

6. The method of claim 4, wherein said selecting a range of camera settings near a selected predetermined camera setting is based on the settings causing saturation and hue differences between objects and between the objects and the background of the video image to exceed a threshold.

7. The method of claim 4, wherein said performing a full search of a selected range of camera settings comprises testing all possible camera settings within the range to find settings that cause saturation and hue differences between objects and between the object and a background of the video image to exceed a threshold.

8. A system comprising:

a storage device having stored therein one or more routines for improving trackability of at least one object within a video image; and a processor coupled to the storage device that when executing the one or more routines improves trackability of objects within the video image by:

loading prior camera settings if any stored prior camera settings are available;

loading one of a plurality of predetermined camera settings;

determining whether the camera settings loaded cause saturation of the video image and hue differences between objects to be tracked and between the objects and a background of the video image to exceed a threshold; and if the saturation and hue differences do not exceed said threshold, searching camera settings to find settings that cause saturation and hue differences between objects and between the objects and the background of the image to exceed said threshold.

9. The system of claim 8, wherein said camera settings comprise saturation, hue, brightness and white balance.

10. The system of claim 8, wherein loading one of a plurality of predetermined camera settings comprises:

reading a user selection describing lighting conditions; and selecting one of said plurality of predetermined camera settings responsive to said user selection.

11. The system of claim 8, wherein searching comprises:

selecting one of said plurality of predetermined camera settings;

selecting a range of camera settings near a selected predetermined camera setting;

performing a full search of a selected range of camera settings; and saving results of said full search.

12. The system of claim 11, wherein said selecting one of said predetermined camera settings is based on the settings causing saturation and hue differences between objects and between the object and a background of the video image to exceed a threshold.

13. The system of claim 11, wherein said selecting a range of camera settings near a selected predetermined camera setting is based on the settings causing saturation and hue differences between objects and between the object and a background of the video image to exceed a threshold.

14. The system of claim 11, wherein said performing a full search of a selected range of camera settings comprises testing all possible camera settings within the range to find settings that cause saturation and hue differences between objects and between the object and a background of the video image to exceed a threshold.

15. A machine readable medium having stored thereon data representing sequences of instructions, said sequences of instructions which, when executed by a processor, cause the processor to maximize trackability of at least one object within an image by:

loading prior camera settings if any stored prior camera settings are available;

loading one of a plurality of predetermined camera settings;

determining whether the camera settings loaded cause saturation of the video image and hue differences between objects to be tracked and between the objects and a background of the video image to exceed a threshold; and if the saturation and hue differences do not exceed said threshold, searching camera settings to find settings that cause saturation and hue differences between objects and between the objects and the background of the image to exceed said threshold.

16. The machine readable medium of claim 15, wherein said camera settings comprise saturation, hue, brightness and white balance.

17. The machine readable medium of claim 15, wherein said loading one of a plurality of predetermined camera settings comprises:

reading a user selection describing lighting conditions; and selecting one of said plurality of predetermined camera settings responsive to said user selection.

18. The machine readable medium of claim 15, wherein said searching comprises:

selecting one of said plurality of predetermined camera settings;

selecting a range of camera settings near a selected predetermined camera setting;

performing a full search of a selected range of camera settings; and saving results of said full search.

19. The machine readable medium of claim 18, wherein said selecting one of said predetermined camera settings is based on the settings causing saturation and hue differences between objects and between the object and a background of the video image to exceed a threshold.

20. The machine readable medium of claim 18, wherein said selecting a range of camera settings near a selected predetermined camera setting is based on the settings causing saturation and hue differences between objects and between the objects and a background of the video image to exceed a threshold.

21. The machine readable medium of claim 18, wherein said performing a full search of a selected range of camera settings comprises testing all possible camera settings within the range to find settings that cause saturation and hue differences between and between the objects and a background of the video image to exceed a threshold.

* * * * *